United States Patent [19]

Medlin, Jr.

[11] Patent Number: 4,688,693

[45] Date of Patent: Aug. 25, 1987

[54] OUTLET BOX BRACKET WITH STABILIZER

[76] Inventor: Lewis B. Medlin, Jr., 186 Wildhurst Ave., Roanoke, Va. 24012

[21] Appl. No.: 893,228

[22] Filed: Aug. 4, 1986

[51] Int. Cl.⁴ .............................................. H02G 3/08
[52] U.S. Cl. ..................................... 220/3.9; 220/3.3; 220/3.6
[58] Field of Search .......................... 220/3.9, 3.6, 3.3; 248/DIG. 6

[56] References Cited

U.S. PATENT DOCUMENTS

| 4,399,922 | 8/1983 | Horsley | 220/3.3 X |
| 4,533,060 | 8/1985 | Medlin | 220/3.3 X |
| 4,569,458 | 2/1986 | Horsley | 220/3.6 |
| 4,572,391 | 2/1986 | Medlin | 220/3.3 X |
| 4,603,789 | 8/1986 | Medlin, Sr. | 220/3.3 X |
| 4,645,089 | 2/1987 | Horsley | 220/3.6 |

Primary Examiner—Steven M. Pollard
Attorney, Agent, or Firm—B. B. Olive

[57] ABSTRACT

An outlet box mounting bracket is formed with a right angle extension formed from material removed to establish an opening to register substantially with the interior chamber of an outlet box. In a modified embodiment, the bracket includes an additional right angular flange effective as a brace against a stud to which the mounting bracket is secured.

10 Claims, 7 Drawing Figures

OUTLET BOX BRACKET WITH STABILIZER

DESCRIPTION

1. Technical Field

The present invention relates to brackets for mounting of electrical equipment and specifically for the mounting of electrical outlet and junction boxes (hereinafter referred to only as outlet boxes) primarily to vertical metal or wooden studs during building construction and/or repair recognizing that such brackets are sometime also secured to ceilings, plaster or drywall during construction.

2. Background Art

When outlet boxes are supported from a metal or wooden stud it has been found desirable to stabilize the cantilevered box and bracket. U.S. Pat. No. 3,767,151 illustrates one means of stabilizing the outlet box by attaching a bracket directly to the box. In U.S. Pat. No. 4,057,164 an adjustable screw is used for stabilizing the outlet box. An L-shaped bracket for mounting outlet boxes formed of a unitary section of sheet metal and having screw passages enabling the outlet box to be mounted without the necessity of removing the mounting screws was developed and marketed by E-Z Mount Bracket Company, Blue Ridge, Va., after issue of the mentioned prior art Pat. No. 4,057,164. The E-Z Mount bracket was followed by the marketing of the type bracket illustrated in U.S. Pat. 4,399,922 in which a portion of a unitary L-shaped mounting bracket is formed as an extension to stabilize both the bracket and the outlet box. Other useful background information relevant to the present invention may be found in U.S. Pat. Nos. 4,135,337, 4,533,060, 4,569,458, and 4,572,391.

As another aspect of the prior art, various techniques been followed for minimizing the amount of metal required to form the bracket. For example, in U.S. Pat. No. 1,206,431 it will noted that a right angled fastening portion of the bracket is formed by pushing out metal from the main body portion of the bracket. In copending application Ser. No. 813,258 to be issued as U.S. Pat. No. 4,603,789 there is illustrated in FIGS. 37-40 a stabilizing arm formed by pushing metal out of an extension plate integrally formed with a mounting bracket. Such arrangement thus provides a desired stabilizer or stiffening arm without requiring additional metal.

The mentioned E-Z Mount outlet bracket, as well as the type bracket illustrated, for example, in U.S. Pat. Nos. 4,135,337, 4,399,922 and 4,533,060, requires the forming of a large central opening in the plate body and which registers with the interior chamber of the outlet box. The outlet box may be a large size 4-11/16" square or a small size 4" square and the opening of corresponding size. Thus, substantial metal has been diverted to waste in forming the required opening. What has not been heretofore recognized is that the opening dimension in the lengthwise direction of the bracket makes possible the forming of a bracket stabilizer suited to the width of the space between the front drywall where the bracket is mounted and the back drywall.

With the foregoing in mind, the object of the present invention is to provide a still further improved outlet box mounting bracket in which a stiffening arm or stabilizer is formed from metal originally incorporated in the plate body portion to which the outlet box is secured and typically removed to form a large central opening and disposed of as scrap.

DISCLOSURE OF INVENTION

In accordance with the present invention, applicant provides a single thin sheet metal formed electrical outlet box mounting bracket for mounting outlet boxes having either two screw tabs and mounting screws on each of two opposed side walls or a pair of diagonally opposite screw tabs and mounting screws on opposed side walls. Of particular significance to the present invention is the presence of a stiffening arm or stabilizer formed out of the material which is typically removed to form an opening opposite the mounting box. The bracket also provides, as in the prior art, for slots or other openings to alleviate the need to remove the screws before attaching the outlet box and/or drywall ring and to provide for installation of the outlet box to the bracket and the brackets to the stud. The pulling of wire, making up of Joints and installation of wiring devices inside the outlet box prior to attaching the drywall ring is facilitated without interference from the stabilizer. The box-mounting portion of the invention bracket is offset slightly rearwardly from the face of the bracket so that when the bracket is mounted and the drywall ring is positioned, there will be no bulging or breaking of the finished drywall plaster on either side. The invention bracket may be made to accommodate either small or large size outlet boxes, such as the standard 4" or 4-11/16 inch sizes or other sizes.

BEST MODE FOR CARRYING OUT THE INVENTION

Figure 1:
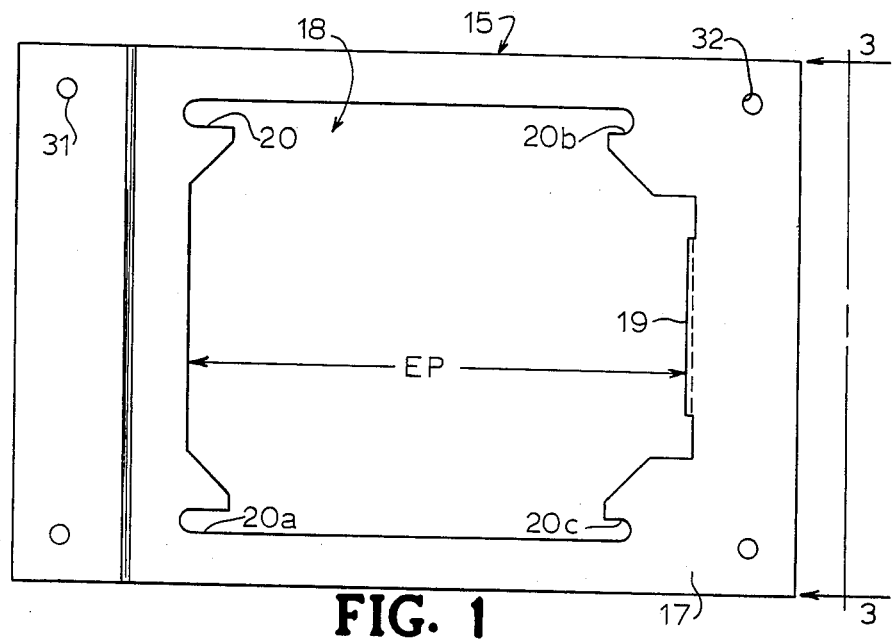
FIG. 1 is a front elevation view of a bracket according to a first embodiment of the invention.

Using the referred to prior art patents for background and referring to the drawings in detail, a conventional outlet box 10 (FIG. 2) of standard 4 inch size, by way of example, carries a pair of diagonally disposed corner fastening means such as mounting screws 11. A cooperating drywall ring 12 of matching size has cooperating corner slots or openings, not shown, for receiving the shanks of the screws 11 prior to tightening as disclosed in the referenced prior art patents.

A T-shaped mounting bracket 15 formed of a single section thin but rigid sheet metal for supporting the outlet box 10 and drywall ring 12 on a metal wall stud 16 includes a front panel 17 having a main central opening 18 to register with the open side of the outlet box 10. Of particular significance to the present invention, a rearwardly extending right angular stabilizing extension 19 is formed of a portion of the metal removed for establishing the opening 18. A hole 21 may be employed when desired to facilitate wiring. The front panel 17 of bracket 15 is provided near its four corners with a group of access openings or slots such as slots 20, 20a, 20b, and 20c. The slots are sized to allow passage therethrough of the shank of outlet box mounting screws, such as the screws 11, prior to tightening the screws to complete the joining of the outlet box 10 and drywall ring 12 to the mounting bracket 15.

The bracket 15 is secured to the stud 16 by means of mounting screws 30 passing through a selected number of openings 31. Additional openings 32 are provided for receiving an extension plate as illustrated for example in FIG. 30 of Pat. No. 4,603,789 or for allowing one bracket 15 to be mounted in a piggyback fashion to another bracket 15 as illustrated for example in FIG. 29 of U.S. Pat. No. 4,572,391.

Figure 2:
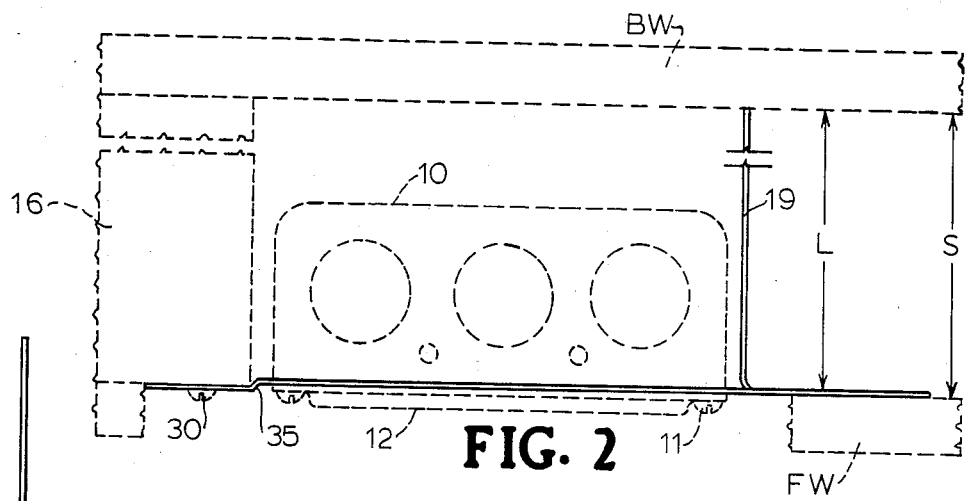
FIG. 2 is a top plan view of the bracket of FIG. 1 with a stud, outlet box and opposing walls indicated in dash lines for reference.
Figure 3:
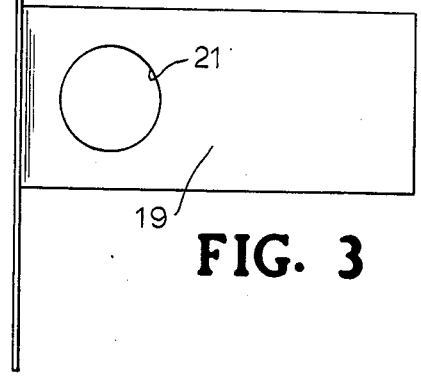
FIG. 3 is an end view taken in the direction of line 3—3 of FIG. 1.
Figure 4:
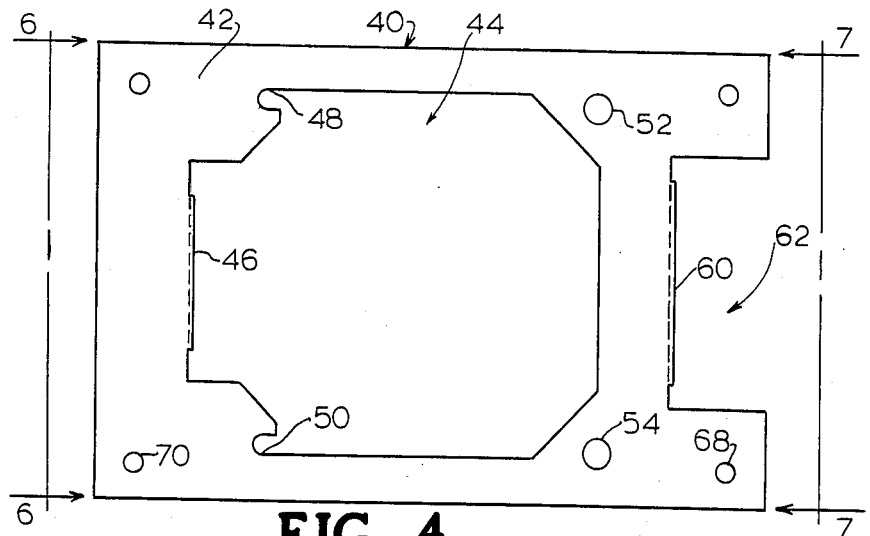
FIG. 4 is a front elevation view of a bracket according to a second embodiment of the invention.

In use the stabilizer 19 of suitable length L, selected from a maximum length EP, to match the space S between the front wall FW and the back wall BW stabilizes both the bracket 15 and the outlet box 10 as best illustrated in FIG. 2. Stabilizer 19 can be used for its full length or its end can be bent at a right angle to shorten the effective length when the width of space S is less. An offset 35 reduces bulging of the drywall ring 12 during drywall finishing operations.

Figure 5:
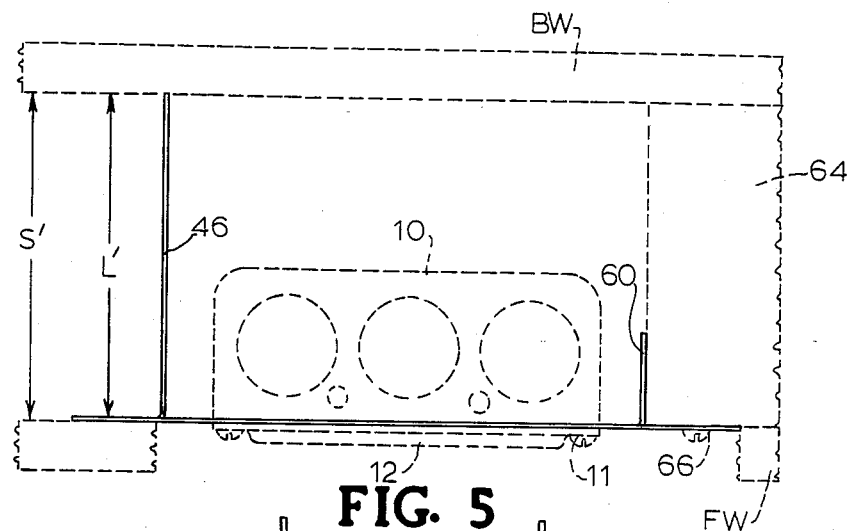
FIG. 5 is a top plan view of the bracket of FIG. 4 with a stud, outlet box and opposing walls indicated in dash lines for reference.
Figures 6, 7:
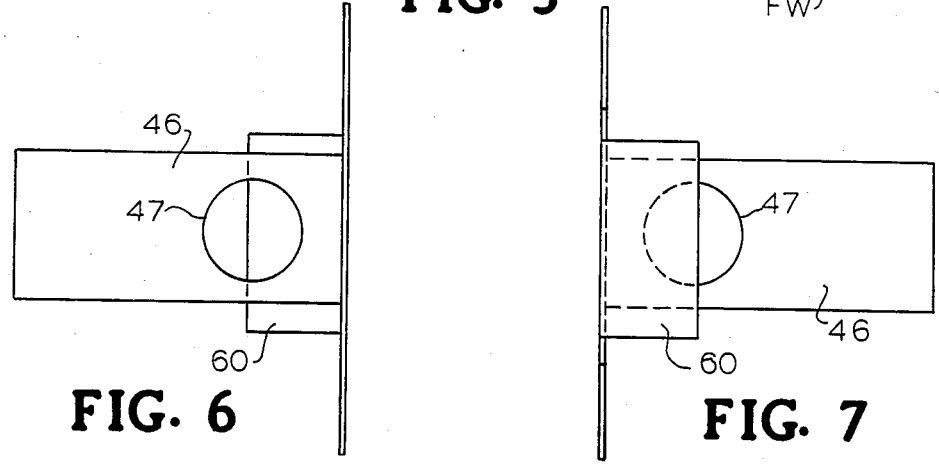
FIG. 6 is an end view taken in the direction of line 6—6 of FIG. 4.
FIG. 7 is an end view taken in the direction of line 7—7 of FIG. 4.

Reference is next made to FIGS. 4–7 and a second embodiment bracket 40. Bracket 40 as illustrated includes a flat front panel 42 having a main central opening 44 to register with the open side of the previously-mentioned outlet box 10. As with the first embodiment, bracket 40 includes a rearwardly extending right angular stabilizing extension 46 formed from a portion of the metal removed to establish the opening 44 and having an optimal wiring hole 47. The front panel 42 is provided with a pair of openings in the form of slots 48, 50 and another pair of openings in the form of oversized screw head holes 52, 54 and which are employed for mounting the outlet box 10 and drywall ring 12 utilizing screws 11 in the manner previously explained. An additional arm or flange 60 is formed by folded out metal removed from the large, slot-like opening 62 illustrated in FIG. 4. As best illustrated in FIG. 5 flange 60 serves both as a stop and as a brace residing against the stud 64 illustrated in FIG. 5. Bracket 40 is secured by suitable fasteners 66 passed through openings 68. Stabilizer 46 acts in the same manner as stabilizer 19 of the first embodiment and has a length L' matching the space S' between front wall FW and back wall BW. Another set of openings 70 facilitate attachment of an extension plate or a piggyback arrangement as previously explained.

It is to be understood that the form of the invention herewith shown and described is to be taken as a preferred example of the same, and that various changes in the shape, size and arrangement of parts may be resorted to, without departing from the spirit of the invention or scope of the appended claims.

What is claimed is:

1. An outlet box mounting bracket formed from a unitary section of stiff sheet material, said mounting bracket including a flat plate body portion having a relatively large central opening of a size and shape to register substantially with the interior chamber of an outlet box, said plate body portion having at least a pair of screw shank receiving openings formed therethrough and disposed on a diagonal axis across the relatively large central opening, said mounting bracket further including a right angular stabilizing rectangular plate extension formed from sheet material removed to establish said opening, an outermost edge of said plate extension being adapted to engage an opposing wall surface during use and said extension being disposed at and extending outwardly from one side of said opening, the plate body portion of said bracket also having plural spaced bracket mounting openings formed therethrough near the edge of the plate body portion remote from said right angular stabilizing plate extension, whereby the mounting bracket can be attached to a wall stud by means of fasteners placed through said bracket mounting openings.

2. An outlet box mounting bracket as claimed in claim 1 including a right angular flange formed out of material establishing an opening near the edge of the plate body portion remote from said plate extension, said flange being adapted to engage a side surface of a stud to which said mounting bracket is secured and thereby further stablilize said bracket.

3. An outlet box mounting bracket as claimed in claim 2 wherein said extension plate and flange occupy parallel planes.

4. An outlet box mounting bracket as claimed in claim 1 wherein the plane of said extension plate is parallel to the opening edge at the side of said opening from which said extension plate extends.

5. An outlet box mounting bracket formed from a unitary section of stiff sheet material, said mounting bracket including a flat plate body portion having at least one relatively large central opening of a size and shape to register substantially with the interior chamber of an outlet box, said flat body portion having at least a pair of screw shank receiving openings formed therethrough and disposed on a diagonal axis across the relatively large central opening, said mounting bracket further including at least one right angular stabilizing rectangular plate extension formed from sheet material removed to establish said opening and extending outwardly therefrom with an outermost edge of said plate extension being adapted to engage an opposing wall surface during use, said bracket also including plural spaced bracket mounting openings formed through at least one end plate portion forming an extension of said flat plate body portion enabling the mounting bracket to be attached to a wall stud by means of fasteners placed through said bracket mounting openings.

6. An outlet box mounting bracket as claimed in claim 5 wherein said flat plate body and end plate portions occupy the same plane.

7. An outlet box mounting bracket as claimed in claim 5 wherein said flat plate and end plate portions resise in offset parallel planes separated by at least one defined offset formed in said bracket between said flat plate and end plate portions.

8. An outlet box mounting bracket formed from a unitary section of stiff sheet material, said mounting bracket including a flat plate body portion having at least one relatively large central opening of a size and shape to register substantially with the interior chamber of an outlet box, said flat plate body portion having at least a pair of screw shank opeings formed therethrough and disposed on a diagonal axis across the relatively large central opening said mounting bracket further including at least one right angular stabilizing rectangular plate extension formed from sheet material removed to establish said opening and extending outwardly therefrom with an outermost edge of said plate extension being adapted to engage an opposing wall surface during use.

9. An outlet box mounting bracket as claimed in claim 8 wherein said bracket includes plural spaced bracket mounting openings formed through at least one end plate portion forming an extension of said flat plate body portion enabling the mounting bracket to be attached to a wall stud by means of fasteners placed through said bracket mounting openings.

10. An outlet box mounting bracket as claimed in claim 8 wherein said flat plate body and end plate portions reside in offset parallel planes separated by at least one defined offset formed in said bracket between said flat plate body and end plate portions.

* * * * *

UNITED STATES PATENT AND TRADEMARK OFFICE
CERTIFICATE OF CORRECTION

PATENT NO. : 4,688,693
DATED : August 25, 1987
INVENTOR(S) : Lewis B. Medlin, Jr.

It is certified that error appears in the above-identified patent and that said Letters Patent is hereby corrected as shown below:

Column 1, line 36, insert --have-- after "techniques".

Column 4, line 50, correct "resise" to read --reside--.

Column 4, line 60, correct "opeings" to read --openings--.

Signed and Sealed this

Fifth Day of January, 1988

Attest:

DONALD J. QUIGG

*Attesting Officer*    *Commissioner of Patents and Trademarks*